(12) United States Patent
Duan

(10) Patent No.: US 9,338,854 B1
(45) Date of Patent: May 10, 2016

(54) SAFETY SWITCH APPARATUS, UNIVERSAL LED TUBE HAVING THE SAFETY SWITCH APPARATUS, AND POWER SYSTEM OF THE UNIVERSAL LED TUBE

(71) Applicant: Cooler Master (Hui Zhou) Co., Ltd., Hui Zhou, Guang Dong Province (CN)

(72) Inventor: Qiang-Fei Duan, Hui Zhou (CN)

(73) Assignee: COOLER MASTER (HUI ZHOU) CO., LTD., Hui Zhou, Guang Dong Province (CN)

( * ) Notice: Subject to any disclaimer, the term of this patent is extended or adjusted under 35 U.S.C. 154(b) by 0 days.

(21) Appl. No.: 14/620,804

(22) Filed: Feb. 12, 2015

(51) Int. Cl.
- H05B 33/08 (2006.01)
- F21S 4/00 (2016.01)
- F21V 23/02 (2006.01)
- F21K 99/00 (2016.01)
- F21Y 103/00 (2016.01)

(52) U.S. Cl.
CPC ............... *H05B 33/089* (2013.01); *F21K 9/17* (2013.01); *F21S 4/008* (2013.01); *F21V 23/02* (2013.01); *H05B 33/0815* (2013.01); *F21Y 2103/003* (2013.01)

(58) Field of Classification Search
CPC .......... H05B 33/0815; H05B 33/0818; H05B 33/0884; H05B 33/0809; H05B 33/0848; H05B 33/0896; H05B 37/029; H05B 37/02
USPC ..................................... 315/200 R, 122, 182
See application file for complete search history.

(56) References Cited

U.S. PATENT DOCUMENTS

| | | | | |
|---|---|---|---|---|
| 7,239,087 | B2 * | 7/2007 | Ball | H05B 33/0815 315/122 |
| 2010/0164389 | A1 * | 7/2010 | Dellian | H05B 33/0803 315/182 |
| 2011/0057568 | A1 * | 3/2011 | Tsai | H02M 5/293 315/121 |
| 2011/0210684 | A1 * | 9/2011 | Lanchava | F21V 21/096 315/312 |
| 2012/0194078 | A1 * | 8/2012 | Ren | H05B 33/0887 315/122 |
| 2012/0200230 | A1 * | 8/2012 | Esaki | H05B 33/0851 315/200 R |
| 2012/0248994 | A1 * | 10/2012 | Chen | H05B 35/00 315/182 |
| 2014/0042905 | A1 * | 2/2014 | Lee | H05B 33/0809 315/85 |
| 2014/0265900 | A1 * | 9/2014 | Sadwick | H05B 33/0809 315/200 R |
| 2014/0320018 | A1 * | 10/2014 | Reiser | H05B 33/0803 315/122 |

* cited by examiner

*Primary Examiner* — Douglas W Owens
*Assistant Examiner* — Syed M Kaiser
(74) *Attorney, Agent, or Firm* — Muncy, Geissler, Olds & Lowe, P.C.

(57) ABSTRACT

A universal LED tube includes a LED light bar, a power conversion apparatus, and a safety switch apparatus. The power conversion apparatus converts an external power source to provide the required power for supplying the LED light bar. The safety switch apparatus is connected to the LED light bar and the power conversion apparatus. The LED light bar is driven to emit light by the external power source after a switch module of the safety switch apparatus is certainly turned on.

16 Claims, 11 Drawing Sheets

SAFETY SWITCH APPARATUS, UNIVERSAL LED TUBE HAVING THE SAFETY SWITCH APPARATUS, AND POWER SYSTEM OF THE UNIVERSAL LED TUBE

BACKGROUND

1. Technical Field

The present disclosure relates generally to a LED tube having a safety switch mechanism and a power system of the LED tube, and more particularly to a safety switch apparatus, a universal LED tube having the safety switch apparatus, and a power system of the universal LED tube.

2. Description of Related Art

During the operations of installing or detaching the LED tube, the user may suffer the electric shock when one side of the LED tube is inserted to the tube holder and the other side of the LED tube is held in the user's hand.

In addition, the existing LED tubes have to be installed on the appropriated tube holder, such as the electronic-ballast tube holder or the magnetic-ballast tube holder, or even no-ballast tube holder. Hence, the user has to purchase different LED tubes for the different tube holders so as to increase extra expense and reduce practicality and convenience for the user.

Accordingly, it is desirable to provide a safety switch apparatus, a universal LED tube having the safety switch apparatus, and a power system of the universal LED tube to prevent the electric shock, increase practicality and convenience, and reduce labor costs.

SUMMARY

An object of the present disclosure is to provide a safety switch apparatus to solve the above-mentioned problem. The safety switch apparatus is connected to a LED light bar and a power conversion apparatus. The power conversion apparatus converts an external power source to provide the required power to drive the LED light bar. The safety switch apparatus includes a switch module, a full-bridge conversion unit, a trigger circuit, a start capacitor, and a branch diode. The switch module has a first terminal, a second terminal, and a trigger terminal. The full-bridge conversion unit has a first power source terminal, a second power source terminal, a first output terminal, and a second output terminal. The first output terminal is connected to the second terminal of the switch module, the second output terminal is connected to the first terminal of the switch module, and the first power source terminal is connected to the LED light bar. The trigger circuit at least includes a diode, a transformer, and a trigger hold-on unit. The diode has an anode terminal and a cathode terminal. The transformer has a first primary terminal, a second primary terminal, a first secondary terminal, and a second secondary terminal. The first primary terminal is connected to the second power source terminal, the second primary terminal is connected to the external power source, and the second secondary terminal is connected to the anode terminal. The trigger hold-on unit is connected to the first secondary terminal, the cathode terminal, and the second terminal and the trigger terminal of the switch module. The start capacitor has a first terminal and a second terminal. The first terminal is connected to the first power source terminal of the full-bridge conversion unit, and the second terminal is connected to the second power source terminal of the full-bridge conversion unit and the first primary terminal of the transformer to form a first branch. The branch diode has an anode terminal and a cathode terminal. The anode terminal is connected to the second output terminal of the full-bridge conversion unit, and the cathode terminal is connected to the first terminal of the switch module to form a second branch. The trigger hold-on unit generates the required power to drive the switch module to ensure that the external power source supplies to the LED light bar after the switch module is turned on when the external power source is configured to supply power to the LED light bar.

Another object of the present disclosure is to provide a universal LED tube having a safety switch apparatus to solve the above-mentioned problem. The universal LED tube includes a LED light bar, a power conversion apparatus, and a safety switch apparatus. The power conversion apparatus converts an external power source to provide the required power to drive the LED light bar. The safety switch apparatus is connected to the LED light bar and the power conversion apparatus. The safety switch apparatus includes a switch module, a full-bridge conversion unit, and a trigger circuit. The switch module has a first terminal, a second terminal, and a trigger terminal. The full-bridge conversion unit has a first power source terminal, a second power source terminal, a first output terminal, and a second output terminal. The first output terminal is connected to the second terminal of the switch module, the second output terminal is connected to the first terminal of the switch module, and the first power source terminal is connected to the LED light bar. The trigger circuit at least includes a diode, a transformer, and a trigger hold-on unit. The diode has an anode terminal and a cathode terminal. The transformer has a first primary terminal, a second primary terminal, a first secondary terminal, and a second secondary terminal. The first primary terminal is connected to the second power source terminal, the second primary terminal is connected to the external power source, and the second secondary terminal is connected to the anode terminal. The trigger hold-on unit is connected to the first secondary terminal, the cathode terminal, and the second terminal and the trigger terminal of the switch module. The start capacitor has a first terminal and a second terminal. The first terminal is connected to the first power source terminal of the full-bridge conversion unit, and the second terminal is connected to the second power source terminal of the full-bridge conversion unit and the first primary terminal of the transformer to form a first branch. The branch diode has an anode terminal and a cathode terminal. The anode terminal is connected to the second output terminal of the full-bridge conversion unit, and the cathode terminal is connected to the first terminal of the switch module to form a second branch. The trigger hold-on unit generates the required power to drive the switch module to ensure that the external power source supplies to the LED light bar after the switch module is turned on when the external power source is configured to supply power to the LED light bar.

Further another object of the present disclosure is to provide a power system of a universal LED tube to solve the above-mentioned problem. The power system includes a tube holder and a universal LED tube. The tube holder provides an external power source. The universal LED tube has a first terminal of a first side, a second terminal of the first side, a first terminal of a second side, and a second terminal of the second side, and installed on the tube holder through the terminals. The universal LED tube includes a LED light bar, a power conversion apparatus, and a safety switch apparatus. The power conversion apparatus converts an external power source to provide the required power for driving the LED light bar. The safety switch apparatus is connected to the LED light bar and the power conversion apparatus. The safety switch apparatus includes a switch module, a full-bridge conversion unit, and a trigger circuit. The switch module has a first terminal, a second terminal, and a trigger terminal. The full-bridge conversion unit has a first power source terminal, a second power source terminal, a first output terminal, and a second output terminal. The first output terminal is connected to the second terminal of the switch module, the second output terminal is connected to the first terminal of the switch module, and the first power source terminal is connected to the LED light bar. The trigger circuit at least includes a diode, a transformer, and a trigger hold-on unit. The diode has an anode terminal and a cathode terminal. The transformer has a first primary terminal, a second primary terminal, a first secondary terminal, and a second secondary terminal. The first primary terminal is connected to the second power source terminal, the second primary terminal is connected to the external power source, and the second secondary terminal is connected to the anode terminal. The trigger hold-on unit is connected to the first secondary terminal, the cathode terminal, and the second terminal and the trigger terminal of the switch module. The start capacitor has a first terminal and a second terminal; wherein the first terminal is connected to the first power source terminal of the full-bridge conversion unit, and the second terminal is connected to the second power source terminal of the full-bridge conversion unit and the first primary terminal of the transformer to form a first branch. The branch diode has an anode terminal and a cathode terminal. The anode terminal is connected to the second output terminal of the full-bridge conversion unit, and the cathode terminal is connected to the first terminal of the switch module to form a second branch. The trigger hold-on unit generates the required power to drive the switch module to ensure that the external power source supplies to the LED light bar after the switch module is turned on when the external power source is configured to supply power to the LED light bar.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
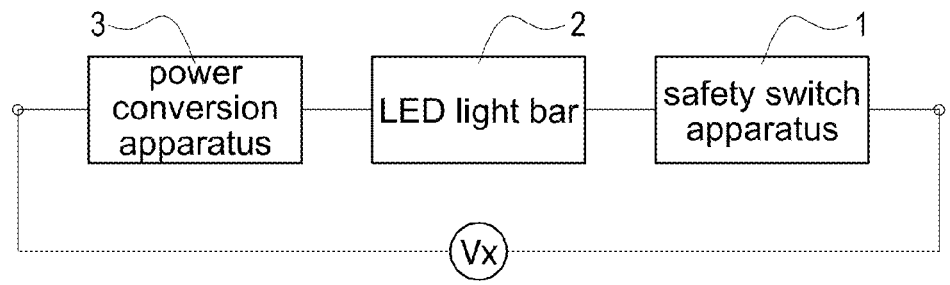
FIG. 1 is a block circuit diagram of a safety switch apparatus applied to a light-emitting diode (LED) tube according to the present disclosure.

Reference will now be made to the drawing figures to describe the present disclosure in detail.

Reference is made to FIG. 1 which is a block circuit diagram of a safety switch apparatus applied to a light-emitting diode (LED) tube according to the present disclosure. The safety switch apparatus 1 is connected to a LED light bar 2 and a power conversion apparatus 3. The LED light bar 2 has a plurality of LEDs arranged thereon, and the LEDs can be arranged in the in-series structure, the in-parallel structure, or the combined series-parallel structure according to actual demands. However, these examples are for demonstration and not for limitation of the present disclosure.

Especially, the power conversion apparatus 3, the LED light bar 2, and the safety switch apparatus 1 are installed inside a tube, as detailed later. The tube is installed on a tube holder and is supplied power by an external power source Vx so as to light the LEDs. In addition, the LED tube further includes a visual filament circuit 4. The detailed operation of the visual filament circuit 4 will be described hereinafter as follows.

Figure 16:
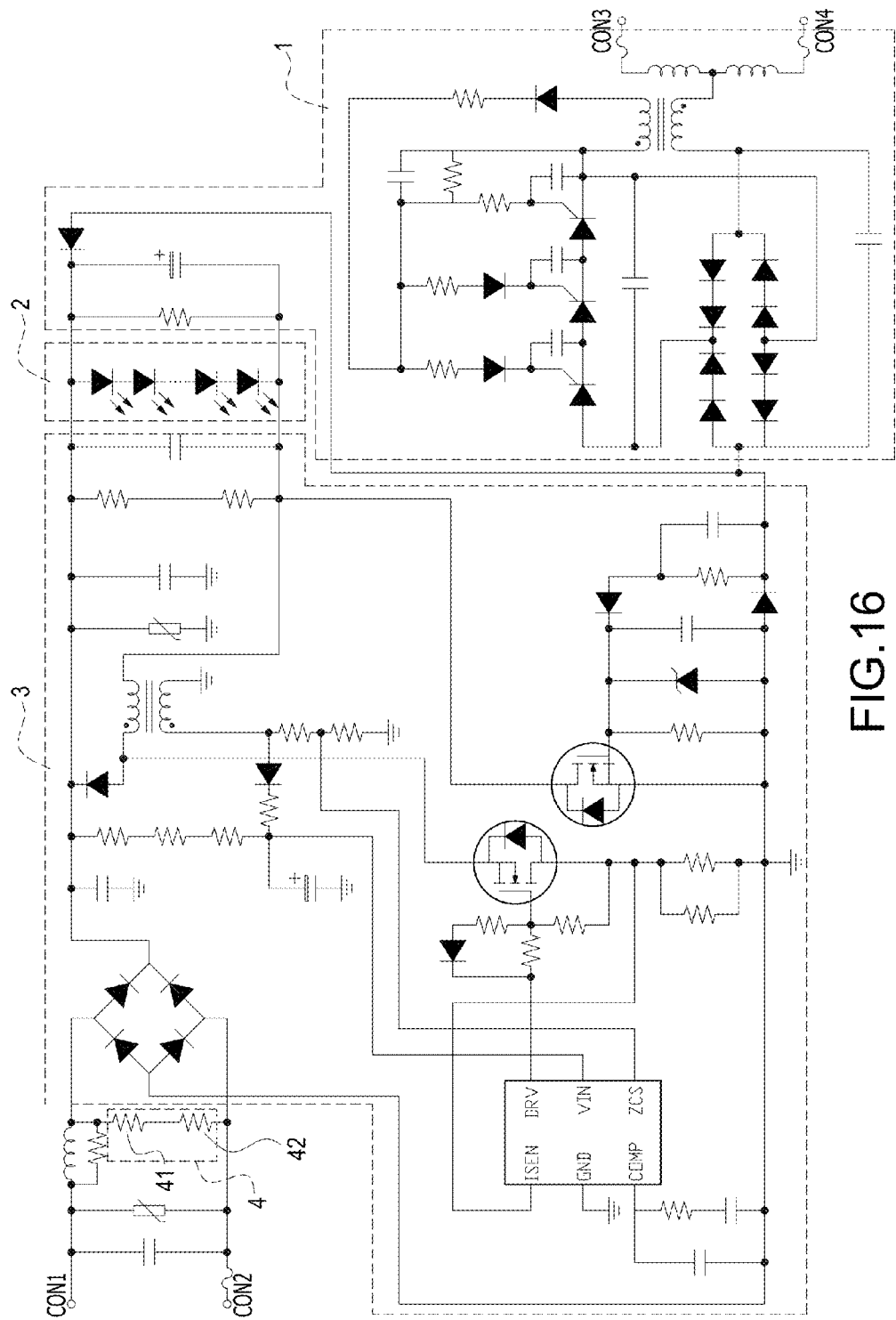
FIG. 16 is a detailed circuit diagram of a universal LED tube according to the present disclosure.

Reference is made to FIG. 16 which is a detailed circuit diagram of a universal LED tube according to the present disclosure. FIG. 16 shows the complete circuit structure of the universal LED tube including the safety switch apparatus 1, the LED light bar 2, the power conversion apparatus 3, and the visual filament circuit 4. The universal LED tube is installed on a tube holder by the terminals CON1-CON4.

The main functions of the universal LED tube are listed as follows.

1. Different types of universal LED tubes, such as the electronic-ballast LED tube, the magnetic-ballast LED tube, and no-ballast LED tube can be directly replaced for use without changing the circuit structure; and 2. The safety switch apparatus 1 of the universal LED tube is provided to ensure the safety of operating the universal LED tube under a power-on condition to meet the international standards for safety.

Figure 2:
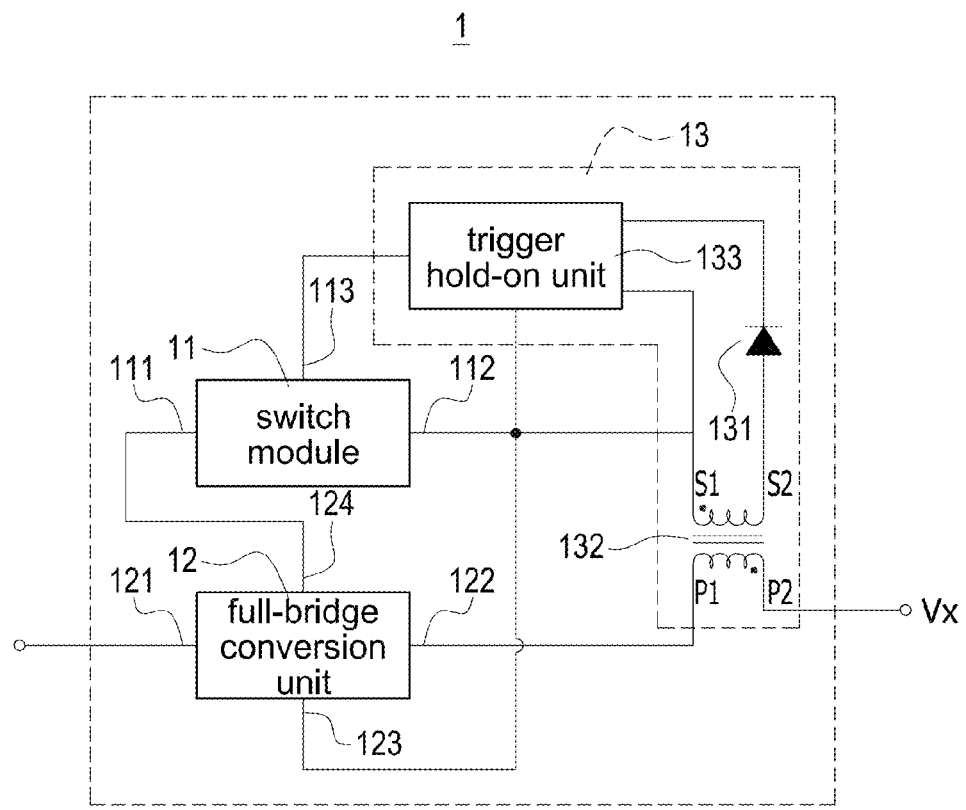
FIG. 2 is a block circuit diagram of a safety switch apparatus according to the present disclosure.

Reference is made to FIG. 2 which is a block circuit diagram of a safety switch apparatus according to the present disclosure. The safety switch apparatus 1 is connected to a LED light bar 2 and a power conversion apparatus 3. The power conversion apparatus 3 converts an external power source Vx to provide the required power to the LED light bar 2. The safety switch apparatus 1 includes a switch module 11, a full-bridge conversion unit 12, and a trigger circuit 13.

The switch module 11 has a first terminal 111, a second terminal 112, and a trigger terminal 113. The full-bridge conversion unit 12 has a first power source terminal 121, a second power source terminal 122, a first output terminal 123, and a second output terminal 124. In particular, the first output terminal 123 is connected to the second terminal 112 of the switch module 11, the second output terminal 124 is connected to the first terminal 111 of the switch module 11, and the first power source terminal 121 is connected to the LED light bar 2.

The trigger circuit 13 at least has a diode 131, a transformer 132, and a trigger hold-on unit 133. The diode 131 has an anode terminal and a cathode terminal. In particular, the transformer 132 is essentially a high-frequency current transformer. The transformer 132 has a first primary terminal P1, a second primary terminal P2, a first secondary terminal S1, and a second secondary terminal S2. The first primary terminal P1 is connected to the second power source terminal 122, the second primary terminal P2 is connected to the external power source Vx, and the second secondary terminal S2 is connected to the anode terminal. The trigger hold-on unit 133 is connected to the first secondary terminal S1, the cathode terminal, the second terminal 112 of the switch module 11, and the trigger terminal 113. The trigger hold-on unit 133 provides the required power to the switch module 11 to ensure that the external power source Vx lights the LED light bar 2 after the switch module 11 is turned on when the external power source Vx supplies power to the LED light bar 2. In other words, the safety switch apparatus 1 of the universal LED tube is provided to ensure the safety of operating the universal LED tube under a power-on condition to meet the international standards for safety by first turning on the switch module 11 and then keeping the output current of the high-frequency current transformer.

The safety switch apparatus 1 is applied to the LED tube to ensure that the switch module 11 is turned on after the LED tube is completely installed on the tube holder. Accordingly, it is to prevent an electric shock when the user installs the LED tube and the external power source Vx drives the LED light bar 2. The detailed operation of the safety switch apparatus 1 will be described hereinafter as follows.

Figure 3:
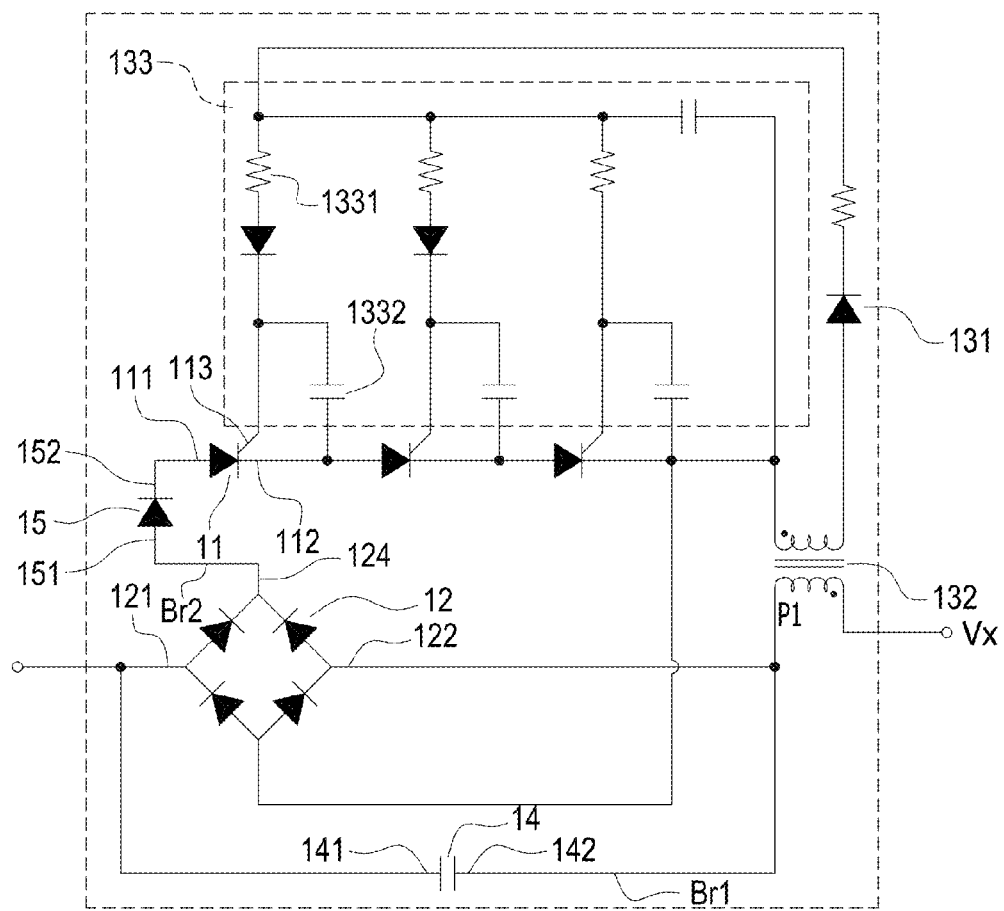
FIG. 3 is a block circuit diagram of the safety switch apparatus according to a first embodiment of the present disclosure.

Reference is made to FIG. 3 which is a block circuit diagram of the safety switch apparatus according to a first embodiment of the present disclosure. In this embodiment, the safety switch apparatus 1 includes the above-mentioned switch module 11, the full-bridge conversion unit 12, the trigger circuit 13, and further includes a start capacitor 14 and a branch diode 15. In particular, the start capacitor 14 has a capacitance value of between 470 pF to 2.2 nF.

The start capacitor 14 has a first terminal 141 and a second terminal 142. The first terminal 141 is connected to the first power source terminal 121 of the full-bridge conversion unit 12, and the second terminal 142 is connected to the second power source terminal 122 of the full-bridge conversion unit 12 and the first primary terminal P1 of the transformer 132 to form a first branch Br1. The branch diode 15 has an anode terminal 151 and a cathode terminal 152. The anode terminal 151 is connected to the second output terminal 124 of the full-bridge conversion unit 12, and the cathode terminal 152 is connected to the first terminal 111 of the switch module 11 to form a second branch Br2.

In this embodiment, the switch module 11 includes at least one switch unit, and the at least one switch unit has a first terminal 111, the second terminal 112, and the trigger terminal 113. The trigger hold-on unit 133 includes at least one resistor-capacitor assembly, and the at least one resistor-capacitor assembly is composed of a resistor 1331 and a capacitor 1332. The resistor 1331 is connected to the capacitor 1332 in series to form a first connection terminal, a second connection terminal, and a common connection terminal. The first connection terminal is connected to the cathode terminal of the diode 131, the second connection terminal is connected to the second terminal 112 of the at least one switch unit, and the common connection terminal is connected to the trigger terminal 113 of the at least one switch unit. Especially, the number of the resistor-capacitor assembly is equal to that of the switch unit. In this embodiment, the number of the switch unit is three and the number of the resistor-capacitor assembly is also three.

For the actual application, several switch units are in an in-series structure to increase the withstand voltage of insulation for the security consideration. In addition, the switch unit is preferably a silicon controlled rectifier (SCR), and the first terminal 111, the second terminal 112, and the trigger terminal 113 are the anode (A), the cathode (K), and the gate (G) of the SCR, respectively.

Figure 4:
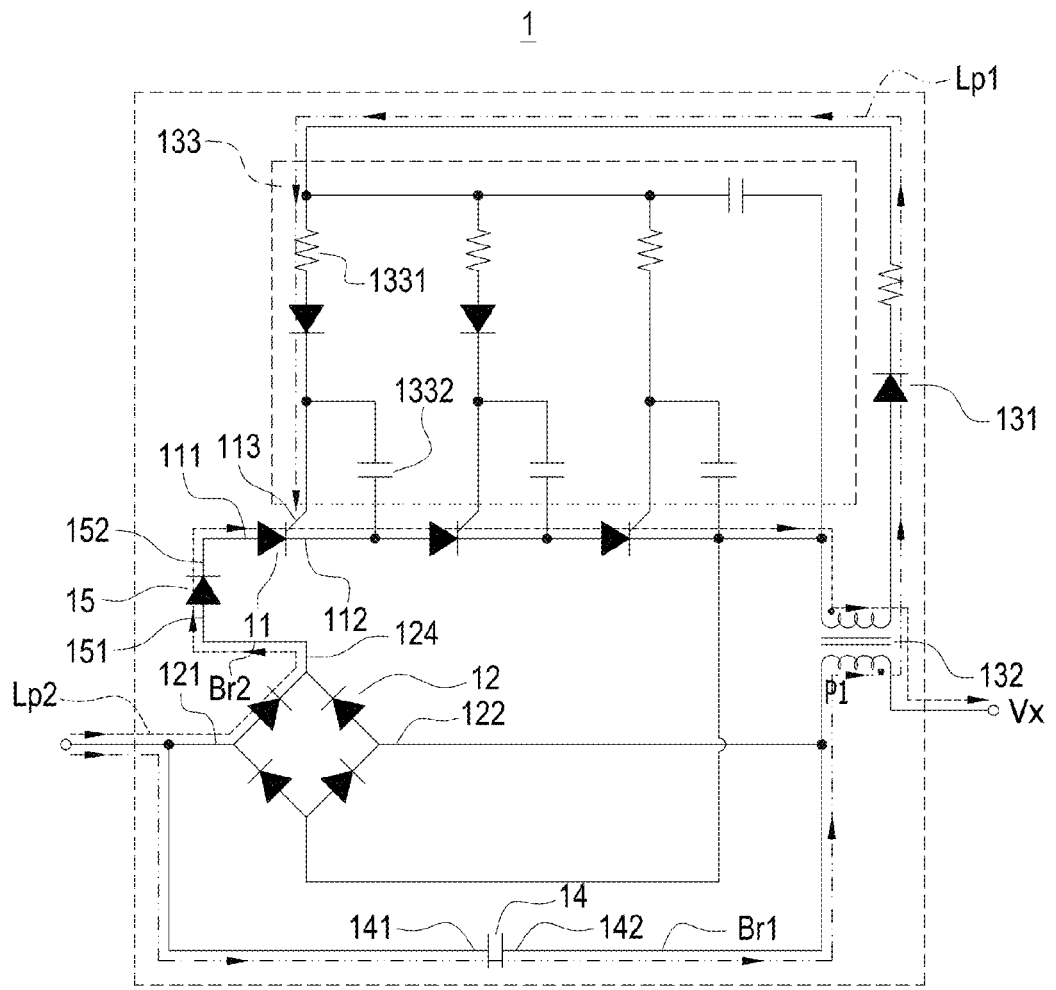
FIG. 4 is schematic operation view of the safety switch apparatus according to the first embodiment of the present disclosure.

Reference is made to FIG. 4 which is a schematic operation view of the safety switch apparatus according to the first embodiment of the present disclosure. For convenience, the single switch unit is exemplified for further demonstration. However, this example is for demonstration and not for limitation of the present disclosure.

When the external power source Vx supplies power to the LED light bar 2 during a positive half cycle, the external power source Vx builds a charge voltage by charging the start capacitor 14. The charge voltage turns on the diode 131 via the first branch Br1 and the transformer 132, and builds a trigger voltage by the resistor-capacitor assembly of the trigger hold-on unit 133. The trigger voltage is provided to trigger the switch module 11 via the trigger terminal 113 so as to turn on the switch module 11. The above-mentioned operation is shown as a first loop Lp1 in FIG. 4.

Especially, the capacitance value of the start capacitor 14 is smaller, between 470 pF to 2.2 nF. Also, the higher the frequency, the smaller the impedance of the start capacitor 14 will be, and vice versa. Accordingly, the charge voltage by charging the start capacitor 14 is built to turn on the switch module 11 via the first branch Br1 under the high-frequency operation.

Afterward, the external power source Vx supplies power to drive the LED light bar 2 via the full-bridge conversion unit 12 and the second branch Br2. The above-mentioned operation is shown as a second loop Lp2 in FIG. 4. Especially, the external power source Vx cannot supply power via the second branch Br2 before the switch module 11 turns on that is the safety switch apparatus 1 is turned off. In other words, the external power source Vx lights the LED tube after the safety switch apparatus 1 has to be turned on. That is, the external power source Vx triggers and turns on the switch module 11 via the first loop Lp1 and then the external power source Vx provides power transmission via the second loop Lp2 under the positive half-cycle operation.

The main technical feature is that the trigger hold-on unit 133 generates the required driven power source for the switch module 11 when the external power source Vx supplies power to the LED light bar 2 to ensure that the switch module 11 is turned on after the LED tube is completely installed on the tube holder. Accordingly, it is to prevent an electric shock when the user installs the LED tube and the external power source Vx drives the LED light bar 2.

In addition, when the external power source Vx supplies power to the LED light bar 2 during a negative half cycle, the voltage provided from the secondary side of the transformer 132 is reverse-biased to the diode 131. The capacitor 1332 of the resistor-capacitor assembly can provide the sufficient to keep turning on the switch module 11 during the negative half cycle. At the next positive half cycle, the external power source Vx triggers and turns on the switch module 11 via the first loop Lp1 and then transmits power via the second loop Lp2 again.

Figure 5:
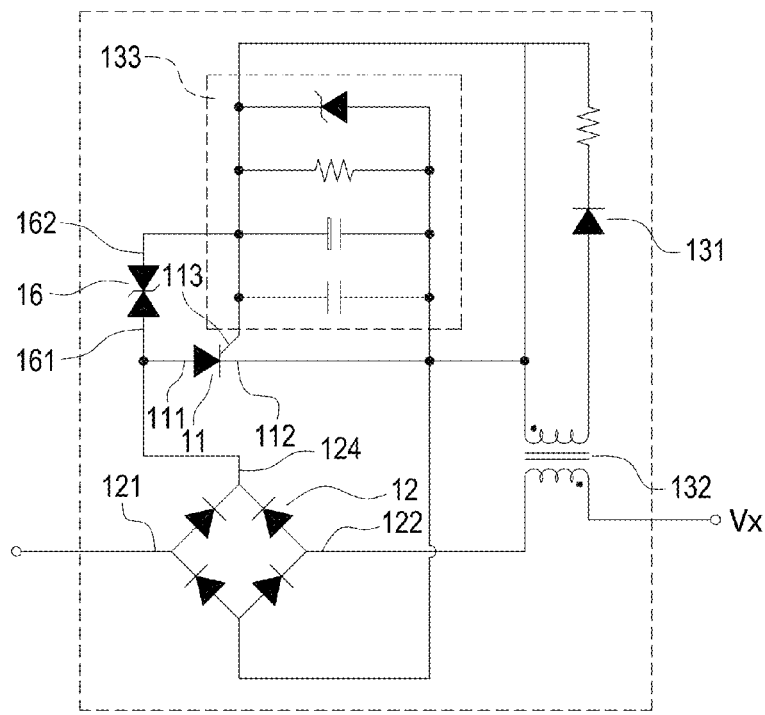
FIG. 5 is a schematic operation view of the safety switch apparatus according to the second embodiment of the present disclosure.

Reference is made to FIG. 5 which is a schematic operation view of the safety switch apparatus according to the second embodiment of the present disclosure. In this embodiment, the safety switch apparatus 1 includes the above-mentioned switch module 11, the full-bridge conversion unit 12, the trigger circuit 13, and further a voltage suppressing diode 16. The voltage suppressing diode 16 can be a transient voltage suppresser (TVS). The voltage suppressing diode 16 has a first terminal 161 and a second terminal 162. The first terminal 161 is connected to the second output terminal 124 of the full-bridge conversion unit 12 and the first terminal 11 of the switch module 11, and the second terminal 162 is connected to the trigger hold-on unit 133.

In addition, the switch module 11 includes a switch unit, and the switch unit has the first terminal 111, the second terminal 112, and the trigger terminal 113. The trigger hold-on unit 133 mainly has Zener diode and a resistor-capacitor assembly. The resistor-capacitor assembly is composed of a resistor and a capacitor. The resistor is connected to the capacitor in parallel to form a first connection terminal and a second connection terminal. The resistor-capacitor assembly is connected to the Zener diode in parallel. The first terminal is connected to the second terminal 162 of the voltage suppressing diode 16 and the trigger terminal 113 of the switch module 11, and the second terminal is connected to the second terminal 112 of the second connection terminal.

When the external power source Vx supplies power to the LED light bar 2, an igniting high voltage is generated by a ballast to trigger and turn on the switch module 11 so as to light the LED light bar 2. In particular, the voltage suppressing diode 16 is used to suppress the high voltage of triggering the switch module 11, thus reducing the produced energy during the transient ignition operation. Especially, the voltage suppressing diode 16 can be absent when the igniting voltage of triggering the switch module 11 is appropriate or the output characteristic of the ballast is adjusted.

Figure 6:
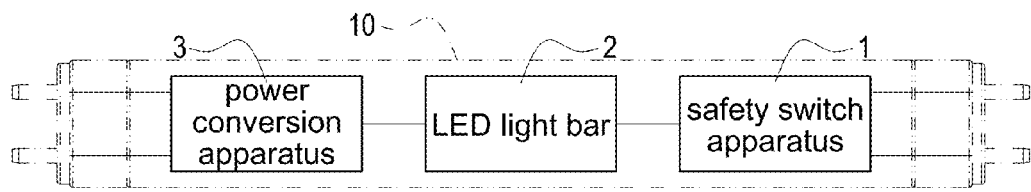
FIG. 6 is a schematic view of a universal LED tube according to the present disclosure.

Reference is made to FIG. 6 is a schematic view of a universal LED tube according to the present disclosure. The universal LED tube 10 includes a LED light bar 2, a power conversion apparatus 3, and a safety switch apparatus 1. The universal LED tube 10 can be a T8-LED tube, but not limited. Especially, although FIG. 6 illustrates that the power conversion apparatus 3, the LED light bar 2, and the safety switch apparatus 1 are in the same plane, a plurality of LEDs are installed on a surface of a substrate, such as a printed circuit board (PCB) or a flexible printed circuit (FPC) to form the LED light bar 2, thus enlarging the illuminated area and increasing the luminous efficiency. In addition, the power conversion apparatus 3 and the safety switch apparatus 1 are installed on the other surface of the substrate to provide operations of power conversion and safety power supplying.

Figure 11:
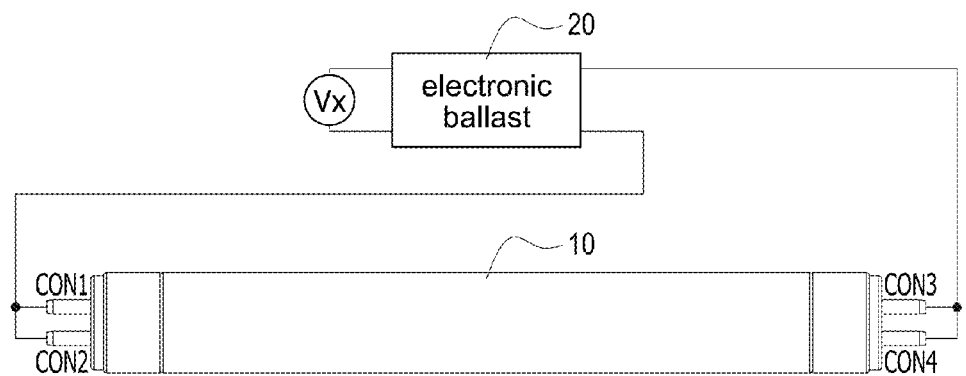
FIG. 11 is a schematic view of the universal LED tube according to a first application embodiment of the present disclosure.
Figure 12:
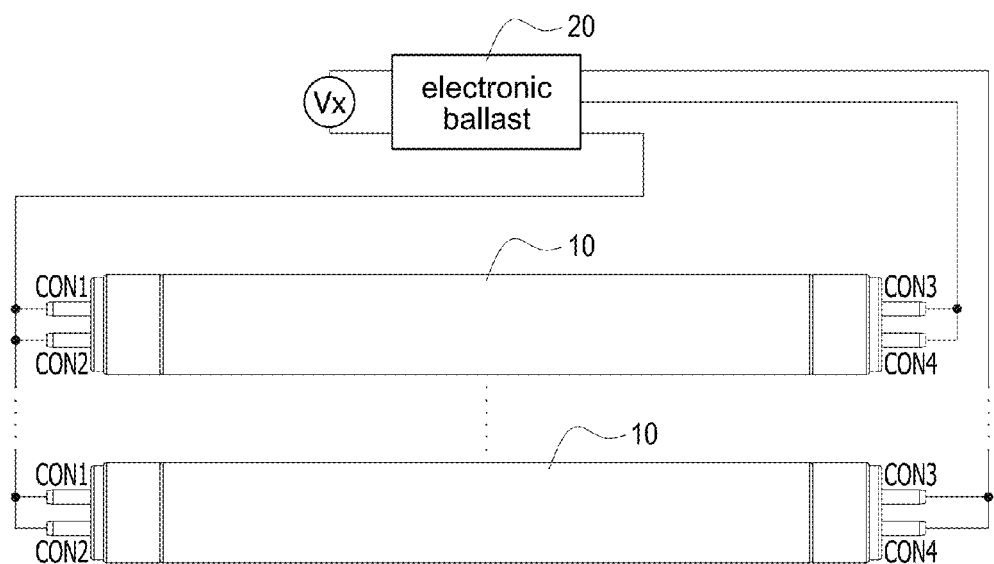
FIG. 12 is a schematic view of the universal LED tube according to a second application embodiment of the present disclosure.
Figure 13:
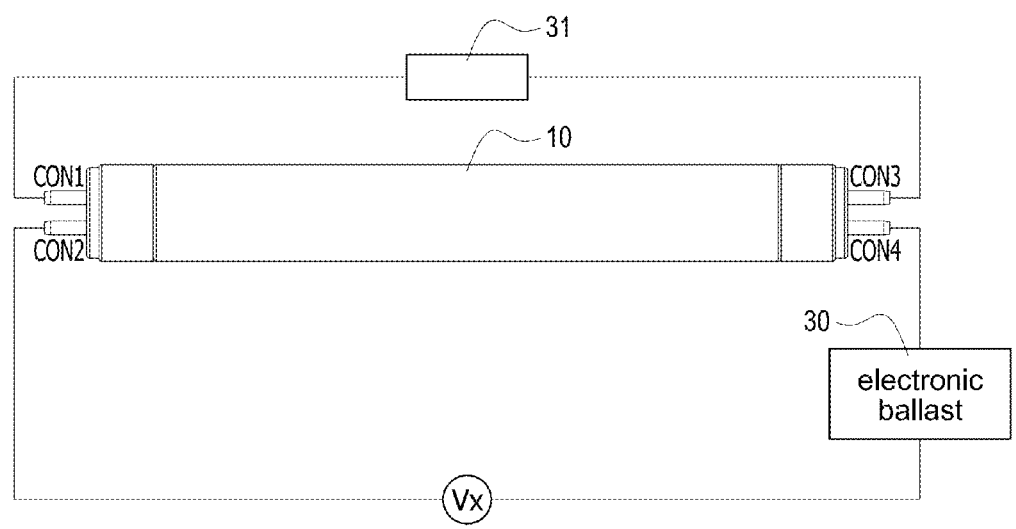
FIG. 13 is a schematic view of the universal LED tube according to a third application embodiment of the present disclosure.

Especially, the "universal" LED tube means that the LED tube can be coordinated with a low-frequency (about 50 Hz-60 Hz) lighting magnetic ballast or a high-frequency (20 kHz-60 kHz) lighting electronic ballast, or even no ballast used, and correspondingly described from FIG. 11 to FIG. 13.

The power conversion apparatus 3 converts an external power source Vx to provide the required power to drive the LED light bar 2. The safety switch apparatus 1 is connected to the LED light bar 2 and the power conversion apparatus 3. The safety switch apparatus 1 mainly includes a switch module 11, a full-bridge conversion unit 12, and a trigger circuit 13. The safety switch apparatus 1 is applied to the LED tube to ensure that the switch module 11 is turned on after the LED tube is completely installed on the tube holder. Accordingly, it is to prevent an electric shock when the user installs the LED tube and the external power source Vx drives the LED light bar 2. Because the operations of the safety switch apparatus 1 can see the descriptions of FIG. 2 to FIG. 5, the detail description is omitted here for conciseness.

Figure 7:
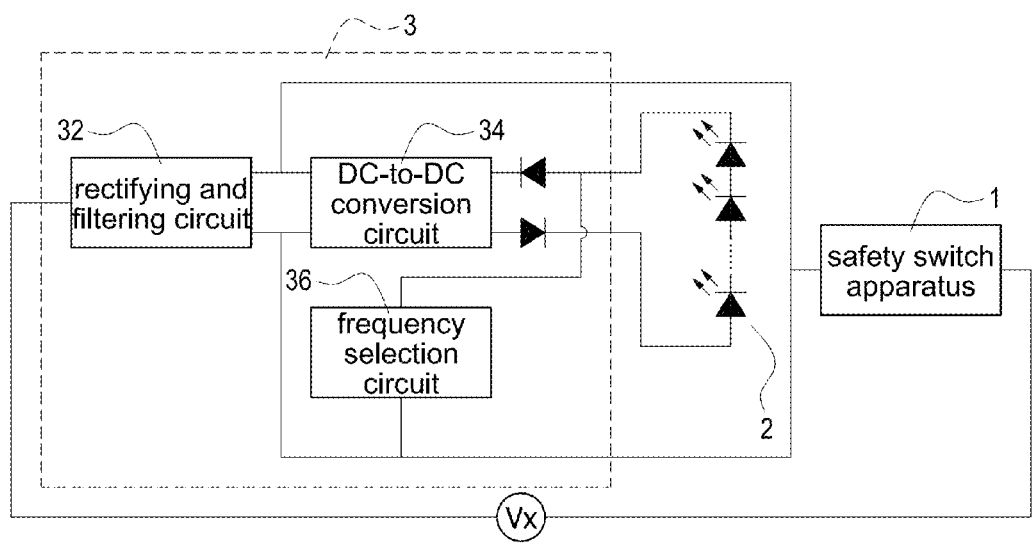
FIG. 7 is a block circuit diagram of power conversion apparatus according to the present disclosure.

Reference is made to FIG. 7 which is a block circuit diagram of power conversion apparatus according to the present disclosure. The power conversion apparatus 3 includes a rectifying and filtering circuit 32, a DC-to-DC conversion circuit 34, and a frequency selection circuit 36. The rectifying and filtering circuit 32 receives the external power source Vx to rectify and filter the external power source Vx to provide a rectified and filtered power source. The DC-to-DC conversion circuit 34 is connected to the rectifying and filtering circuit 32 to converter the rectified and filtered power source to output a driven power source so as to drive the LED light bar 2.

The frequency selection circuit 36 is connected to the rectifying and filtering circuit 32, the DC-to-DC conversion circuit 34, and the LED light bar 2. When the external power source Vx is a high-frequency power source, the frequency selection circuit 36 is in a turned-on operation so that the LED light bar 2 is driven by the high-frequency manner. On the contrary, when the external power source Vx is a low-frequency power source, the frequency selection circuit 36 is in a turned-off operation so that the LED light bar 2 is driven by the low-frequency manner.

Figure 8:
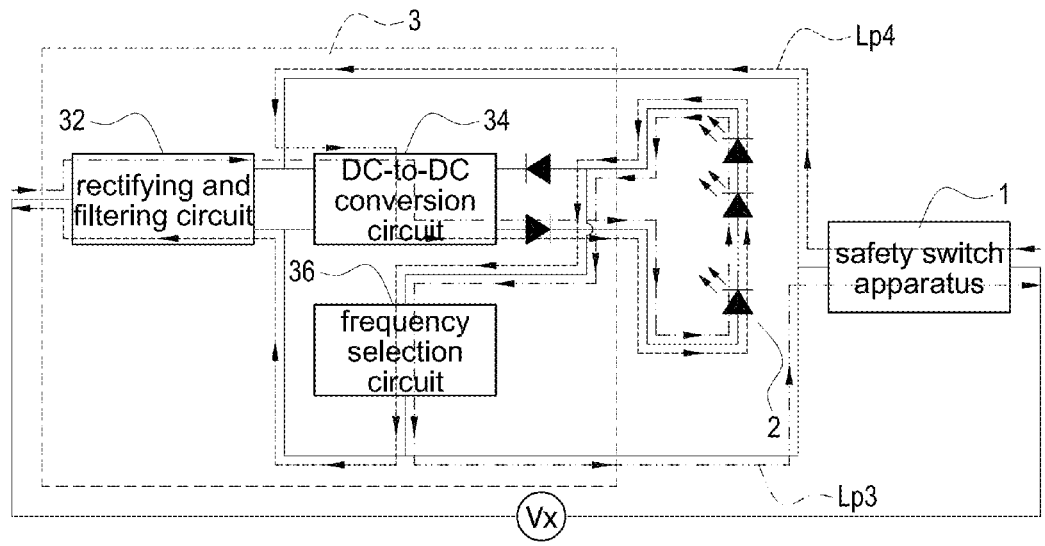
FIG. 8 is a schematic operation view of the power conversion apparatus according to a first embodiment of the present disclosure.

Reference is made to FIG. 8 which is a schematic operation view of the power conversion apparatus according to a first embodiment of the present disclosure. The first embodiment shows a high-frequency operation of the power conversion apparatus 3. When the external power source Vx is a high-frequency power source and in a positive half-cycle operation, the external power source Vx provides a first high-frequency power supplying loop Lp3 sequentially formed by the rectifying and filtering circuit 32, the DC-to-DC conversion circuit 34, the LED light bar 2, the frequency selection circuit 36, and the safety switch apparatus 1. When the external power source Vx is the high-frequency power source and in a negative half-cycle operation, the external power source Vx provides a second high-frequency power supplying loop Lp4 sequentially formed by the safety switch apparatus 1, the DC-to-DC conversion circuit 34, the LED light bar 2, the frequency selection circuit 36, and the rectifying and filtering circuit 32. Accordingly, the LED light bar 2 is driven by the high-frequency external power source Vx via the first high-frequency power supplying loop Lp3 and the second high-frequency power supplying loop Lp4.

Figure 9:
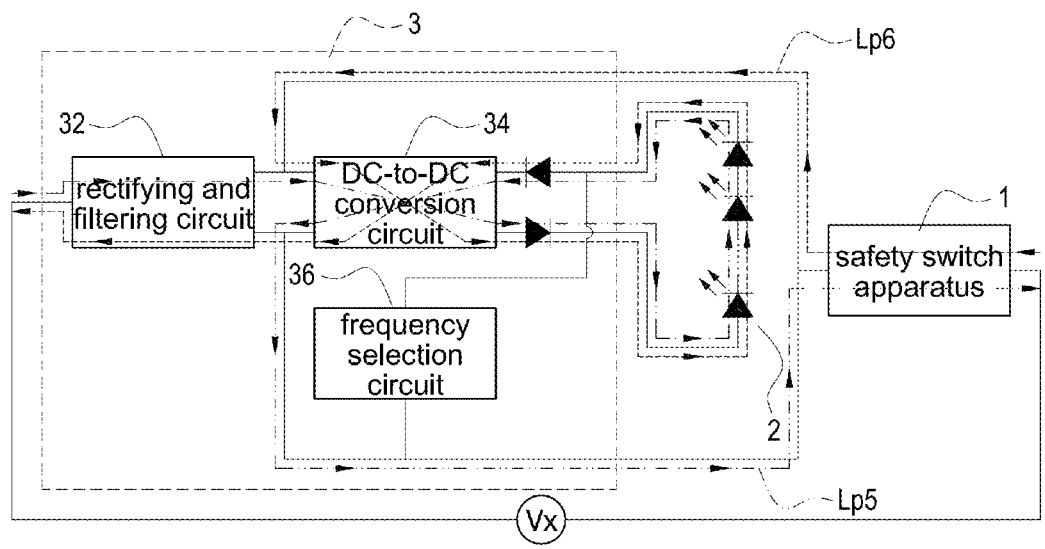
FIG. 9 is a schematic operation view of the power conversion apparatus according to a second embodiment of the present disclosure.

Reference is made to FIG. 9 which is a schematic operation view of the power conversion apparatus according to a second embodiment of the present disclosure. The second embodiment shows a low-frequency operation of the power conversion apparatus 3. When the external power source Vx is a low-frequency power source and in a positive half-cycle operation, the external power source Vx provides a first low-frequency power supplying loop Lp5 sequentially formed by the rectifying and filtering circuit 32, the DC-to-DC conversion circuit 34, the LED light bar 2, and the safety switch apparatus 1. When the external power source Vx is the low-frequency power source and in a negative half-cycle operation, the external power source Vx provides a second low-frequency power supplying loop Lp6 sequentially formed by the safety switch apparatus 1, the DC-to-DC conversion circuit 34, the LED light bar 2, and the rectifying and filtering circuit 32.

In other words, the LED light bar 2 is directly driven by the DC driven voltage converted by the DC-to-DC conversion circuit 34 when the external power source Vx is the low-frequency power source and the frequency selection circuit 36 is in the turned-off operation. In the present disclosure, the DC-to-DC conversion circuit 34 can be a buck converter, a boost converter, or a buck-boost converter. However, this example is for demonstration and not for limitation of the present disclosure.

Figure 10:
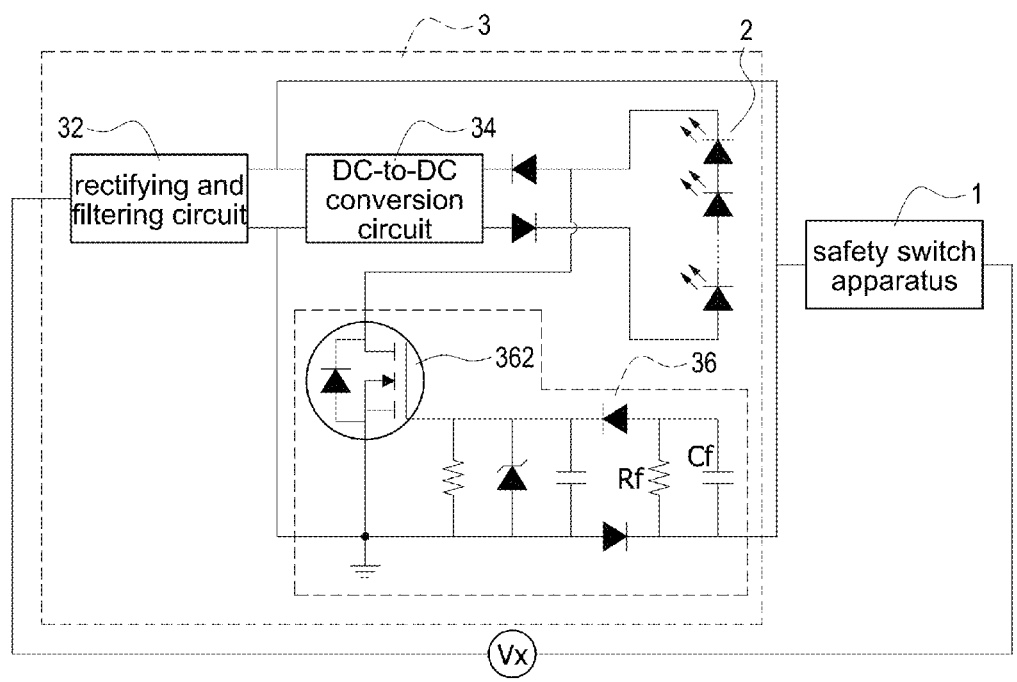
FIG. 10 is a detailed block circuit diagram of the power conversion apparatus according to the present disclosure.

Reference is made to FIG. 10 which is a detailed block circuit diagram of the power conversion apparatus according to the present disclosure. The frequency selection circuit 36 at least has a transistor switch 362, and the corresponding driven circuit is provided according to the high-frequency or low-frequency external power source Vx by turning on or turning off the transistor switch 362. That is, the transistor switch 362 is turned on when the external power source Vx is the high-frequency power source; the transistor switch 362 is turned off when the external power source Vx is the low-frequency power source.

Especially, the frequency selection circuit 36 provides functions of frequency selection and filtering, and the frequency selection circuit 36 is essentially a high-pass filtering circuit. The frequency selection circuit 36 mainly includes the transistor switch 362, a filtering resistor Rf, and a filtering capacitor Cf. A cut-off frequency fz of the high-frequency filtering circuit is:

$$f_z = \frac{1}{2\pi R_f C_f}$$

Hence, the transistor switch 362 is turned on by the filtering resistor Rf and the filtering capacitor Cf when the external power source Vx is the high-frequency power source. On the contrary, the transistor switch 362 is turned off when the external power source Vx is the low-frequency power source.

Reference is made to FIG. 11 which is a schematic view of the universal LED tube according to a first application embodiment of the present disclosure. FIG. 11 shows a circuit connection of installing the universal LED tube 10 on a tube holder (not shown). In other words, the universal LED tube 10 is installed on the tube holder and then the LED tube is supplied power by the external power source Vx to form the power system of the universal LED tube. The power system includes a tube holder and a universal LED tube 10. The tube holder provides an external power source Vx. The universal LED tube 10 has a first terminal of a first side CON1, a second terminal of the first side CON2, a first terminal of a second side CON3, and a second terminal of the second side CON4, and the universal LED tube 10 is installed on the tube holder by the terminals CON1-CON4. The universal LED tube 10 mainly includes a LED light bar 2, a power conversion apparatus 3, and a safety switch apparatus 1. Because the operations of the safety switch apparatus 1 can see the descriptions of FIG. 2 to FIG. 5 and the operations of the power conversion apparatus 3 can see the descriptions of FIG. 7 to FIG. 10, the detail description is omitted here for conciseness.

As shown in FIG. 11, the tube holder has an electronic ballast 20 with two input terminals and at least two output terminals. When the universal LED tube 10 is installed on the tube holder, the first terminal of the first side CON1 and the second terminal of the first side CON2 are connected to each other, and then connected to one of the output terminals of the electronic ballast 20. Also, the first terminal of the second side CON3 and the fourth terminal of the second side CON4 are connected to each other, and connected to the other terminal of the electronic ballast 20. The external power source Vx is connected to the two input terminals of the electronic ballast 20 to supply power to the LED tube 10.

Reference is made to FIG. 12 which is a schematic view of the universal LED tube according to a second application embodiment of the present disclosure. FIG. 12 shows a circuit connection of installing a plurality of universal LED tubes 10 on the tube holder. The tube holder has an electronic ballast 20 with two input terminals and at least two output terminals. When the universal LED tubes 10 are installed on the tube holder, the first terminal of the first side CON1 and the second terminal of the first side CON2 of each universal LED tube 10 are connected to each other, and then connected to one of the output terminals of the electronic ballast 20. Also, the first terminal of the second side CON3 and the fourth terminal of the second side CON4 of each universal LED tube 10 are connected to each other, and correspondingly connected to other output terminals of the electronic ballast 20. The external power source Vx is connected to the two input terminals of the electronic ballast 20 to supply power to the LED tube 10.

Reference is made to FIG. 13 which is a schematic view of the universal LED tube according to a third application embodiment of the present disclosure. The tube holder has a magnetic ballast 30 with one input terminal and an output terminal. When the universal LED tube 10 is installed on the tube holder, the first terminal of the first side CON1 is connected to the first terminal of the second side CON3 via a short-circuit component 31. Also, the second terminal of the second side CON4 is connected to the output terminal of the magnetic ballast 30. The external power source Vx is connected to the input terminal of the magnetic ballast 30 and the second terminal of the first side CON2 to supply power to the LED tube 10.

Figure 14:
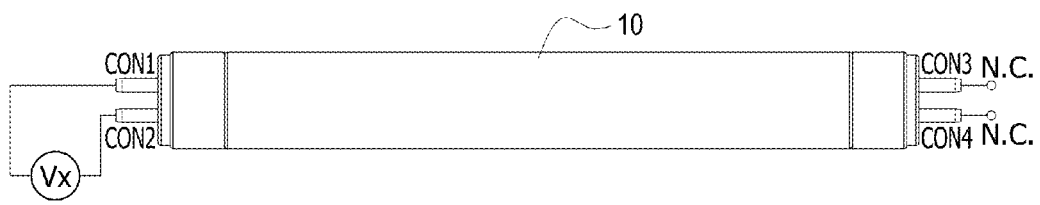
FIG. 14 is a schematic view of the universal LED tube according to a fourth application embodiment of the present disclosure.

Reference is made to FIG. 14 which is a schematic view of the universal LED tube according to a fourth application embodiment of the present disclosure. FIG. 14 shows a circuit connection of installing the universal LED tubes 10 on the tube holder without any ballast. When the universal LED tube 10 is installed on the tube holder, the first terminal of the second side CON3 and the second terminal of the second side CON4 are no connection (N.C.). The external power source Vx is connected to the first terminal of the first side CON1 and a second terminal of the first side CON2 to supply power to the LED tube 10.

Figure 15:
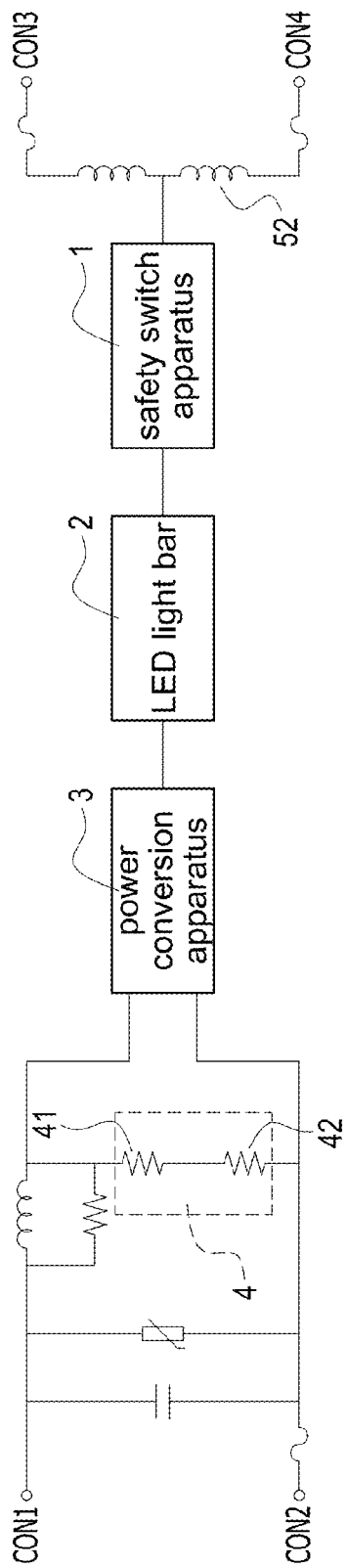
FIG. 15 is a circuit diagram of an electronic visual filament circuit according to the present disclosure.

Reference is made to FIG. 15 which is a circuit diagram of an electronic visual filament circuit according to the present disclosure. The visual filament circuit 4 includes a first detection resistor 41 and a second detection resistor 42. The second detection resistor 42 is connected to the first detection resistor 41 in series to form a detection branch, and the detection branch is connected to the first terminal of the first side CON1 and the second terminal of the first side CON2 of the universal LED tube 10. The first detection resistor 41 is a positive temperature coefficient (PTC) thermal resistor. The visual filament circuit 4 is used to implement the filament and further reduce the power losses and keep the whole efficiency of the power system of the universal LED tube.

In conclusion, the present disclosure has following advantages:

1. The safety switch apparatus 1 is applied to the LED tube to ensure that the switch module 11 is turned on after the LED tube 10 is completely installed on the tube holder so as to prevent an electric shock when the user installs or detaches the LED tube and the external power source Vx drives the LED light bar 2;

2. The electronic safety switch apparatus 1 is applied to automatically detect the condition of the external power source Vx, without pressing any mechanical switch, to increase the operation convenience;

3. The small-scale start capacitor 14 provides the electrical path before the switch module 11 is turned on; and the switch module 11 is turned on after the LED tube is completely installed on the tube holder and the start capacitor 14 generates effective trigger current under the high-frequency operation to build the trigger voltage by the resistor-capacitor assembly;

4. The frequency selection circuit 36 is used to detect whether the external power source Vx is the high-frequency power source or the low-frequency power source so as to provide the suitable driven power source for the LED light bar 2, thus increasing the use efficiency and lifetime of the LED light bar 2;

5. The DC-to-DC conversion circuit 34 can be the different topologies, such as the buck converter, the boost converter, or the buck-boost converter to increase the voltage range of driving the LED light bar 2;

6. The universal LED tube can be coordinated with the low-frequency (about 50 Hz-60 Hz) lighting magnetic ballast or the high-frequency (20 kHz-60 kHz) lighting electronic ballast, or even no ballast used;

7. According to the designs of the safety switch apparatus 1, the frequency selection circuit 36, and the DC-to-DC conversion circuit 34, the LED tube 10 can be universally used for different external power sources Vx. That is, the universal LED tube 10 can be used for different external power sources Vx without changing the circuit structure thereof so as to save the labor costs and component costs for industries and also increase practicality and convenience for users; and 8. The visual filament circuit 4 is used to implement the filament and further reduce the power losses and keep the whole efficiency of the power system of the universal LED tube.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A safety switch apparatus for ensuring safely transmitting a power from a power conversion apparatus to a LED light bar, the power conversion apparatus configured to convert an external power source to provide the required power for driving the LED light bar; the safety switch apparatus comprising:
    a switch module having a first terminal, a second terminal, and a trigger terminal;
    a full-bridge conversion unit having a first power source terminal, a second power source terminal, a first output terminal, and a second output terminal; wherein the first output terminal is connected to the second terminal of the switch module, the second output terminal is connected to the first terminal of the switch module, and the first power source terminal is connected to the LED light bar;
    a trigger circuit at least comprising:
        a diode having an anode terminal and a cathode terminal;
        a transformer having a first primary terminal, a second primary terminal, a first secondary terminal, and a second secondary terminal; wherein the first primary terminal is connected to the second power source terminal, the second primary terminal is connected to the external power source, and the second secondary terminal is connected to the anode terminal; and
        a trigger hold-on unit connected to the first secondary terminal, the cathode terminal, and the second terminal and the trigger terminal of the switch module;
    a start capacitor having a first terminal and a second terminal; wherein the first terminal is connected to the first power source terminal of the full-bridge conversion unit, and the second terminal is connected to the second power source terminal of the full-bridge conversion unit and the first primary terminal of the transformer to form a first branch; and
    a branch diode having an anode terminal and a cathode terminal; wherein the anode terminal is connected to the second output terminal of the full-bridge conversion unit, and the cathode terminal is connected to the first terminal of the switch module to form a second branch;
    wherein the trigger hold-on unit is configured to generate the required power to drive the switch module to ensure that the external power source supplies to the LED light bar after the switch module is turned on when the external power source is configured to supply power to the LED light bar.

2. The safety switch apparatus in claim 1, wherein
    the switch module comprises at least one switch unit, and the at least one switch unit has the first terminal, the second terminal, and the trigger terminal; and
    the trigger hold-on unit comprises at least one resistor-capacitor assembly, and the resistor-capacitor assembly has a resistor and a capacitor connected to the resistor in series to form a first connection terminal, a second connection terminal, and a common connection terminal; wherein the first connection terminal is connected to cathode terminal of the diode, the second connection terminal is connected to the second terminal of the at least one switch unit, and the common connection terminal is connected to the trigger terminal of the at least one switch unit;
    wherein the number of the resistor-capacitor assembly is equal to the number of the at least one switch unit.

3. The safety switch apparatus in claim 2, wherein the external power source is configured to build a charge voltage by charging the start capacitor when the external power source is configured to supply power to the LED light bar; the charge voltage is configured to turn on the diode via the first branch and the transformer, and build a trigger voltage by the resistor-capacitor assembly of the trigger hold-on unit; the trigger voltage is configured to trigger the switch module via the trigger terminal to turn on the switch module so that the external power source is configured to light the LED light bar via the full-bridge conversion unit and the second branch.

4. The safety switch apparatus in claim 1, wherein the start capacitor has a capacitance value of between 470 pF to 2.2 nF.

5. A universal LED tube having a safety switch apparatus, comprises:
- a LED light bar;
- a power conversion apparatus configured to convert an external power source to provide the required power for driving the LED light bar; and
- a safety switch apparatus connected to the LED light bar and the power conversion apparatus, the safety switch apparatus comprising:
- a switch module having a first terminal, a second terminal, and a trigger terminal;
- a full-bridge conversion unit having a first power source terminal, a second power source terminal, a first output terminal, and a second output terminal; wherein the first output terminal is connected to the second terminal of the switch module, the second output terminal is connected to the first terminal of the switch module, and the first power source terminal is connected to the LED light bar;
- a trigger circuit at least comprising:
  - a diode having an anode terminal and a cathode terminal;
  - a transformer having a first primary terminal, a second primary terminal, a first secondary terminal, and a second secondary terminal; wherein the first primary terminal is connected to the second power source terminal, the second primary terminal is connected to the external power source, and the second secondary terminal is connected to the anode terminal; and
  - a trigger hold-on unit connected to the first secondary terminal, the cathode terminal, and the second terminal and the trigger terminal of the switch module;
- a start capacitor having a first terminal and a second terminal; wherein the first terminal is connected to the first power source terminal of the full-bridge conversion unit, and the second terminal is connected to the second power source terminal of the full-bridge conversion unit and the first primary terminal of the transformer to form a first branch; and
- a branch diode having an anode terminal and a cathode terminal; wherein the anode terminal is connected to the second output terminal of the full-bridge conversion unit, and the cathode terminal is connected to the first terminal of the switch module to form a second branch;
- wherein the trigger hold-on unit is configured to generate the required power to drive the switch module to ensure that the external power source supplies to the LED light bar after the switch module is turned on when the external power source is configured to supply power to the LED light bar.

6. The universal LED tube having the safety switch apparatus in claim 5, wherein the power conversion apparatus comprises:
- a rectifying and filtering circuit configured to receive the external power source, rectify and filter the external power source, and provide a rectified and filtered power source;
- a DC-to-DC conversion circuit connected to the rectifying and filtering circuit and configured to converter the rectified and filtered power source into a driven power source to drive the LED light bar; and
- a frequency selection circuit connected to the rectifying and filtering circuit, the DC-to-DC conversion circuit, and the LED light bar; wherein the frequency selection circuit is in a turned-on operation to drive the LED light bar in a high-frequency manner when the external power source is a high-frequency power source; the frequency selection circuit is in a turned-off operation to drive the LED light bar in a low-frequency manner when the external power source is a low-frequency power source.

7. The universal LED tube having the safety switch apparatus in claim 6, wherein the frequency selection circuit at least has a transistor switch; the transistor switch is turned on when the external power source is the high-frequency power source, and the transistor switch is turned off when the external power source is the low-frequency power source.

8. The universal LED tube having the safety switch apparatus in claim 7, wherein the external power source is configured to provide a first high-frequency power supplying loop sequentially formed by the rectifying and filtering circuit, the DC-to-DC conversion circuit, the LED light bar, the transistor switch of the frequency selection circuit, and the safety switch apparatus when the external power source is the high-frequency power and under a positive half-cycle operation; the external power source is configured to provide a second high-frequency power supplying loop sequentially formed by the safety switch apparatus, the DC-to-DC conversion circuit, the LED light bar, the transistor switch of the frequency selection circuit, and the rectifying and filtering circuit.

9. The universal LED tube having the safety switch apparatus in claim 7, wherein the external power source is configured to provide a first low-frequency power supplying loop sequentially formed by the rectifying and filtering circuit, the DC-to-DC conversion circuit, the LED light bar, and the safety switch apparatus when the external power source is the low-frequency power and under a positive half-cycle operation; the external power source is configured to provide a second low-frequency power supplying loop sequentially formed by the safety switch apparatus, the DC-to-DC conversion circuit, the LED light bar, and the rectifying and filtering circuit.

10. A power system of a universal LED tube, comprises:
- a tube holder configured to provide an external power source; and
- a universal LED tube having a first terminal of a first side, a second terminal of the first side, a first terminal of a second side, and a second terminal of the second side, and installed on the tube holder through the terminals; the universal LED tube comprising:
- a LED light bar;
- a power conversion apparatus configured to convert an external power source to provide the required power for driving the LED light bar; and
- a safety switch apparatus connected to the LED light bar and the power conversion apparatus, the safety switch apparatus comprising:
- a switch module having a first terminal, a second terminal, and a trigger terminal;
- a full-bridge conversion unit having a first power source terminal, a second power source terminal, a first output terminal, and a second output terminal; wherein the first output terminal is connected to the second terminal of the switch module, the second output terminal is connected to the first terminal of the switch module, and the first power source terminal is connected to the LED light bar;
- a trigger circuit at least comprising:
  - a diode having an anode terminal and a cathode terminal;
  - a transformer having a first primary terminal, a second primary terminal, a first secondary terminal, and a second secondary terminal; wherein the first primary terminal is connected to the second power source terminal, the second primary terminal is connected to the external power source, and the second secondary terminal is connected to the anode terminal; and a trigger hold-on unit connected to the first secondary terminal, the cathode terminal, and the second terminal and the trigger terminal of the switch module;

a start capacitor having a first terminal and a second terminal; wherein the first terminal is connected to the first power source terminal of the full-bridge conversion unit, and the second terminal is connected to the second power source terminal of the full-bridge conversion unit and the first primary terminal of the transformer to form a first branch; and a branch diode having an anode terminal and a cathode terminal; wherein the anode terminal is connected to the second output terminal of the full-bridge conversion unit, and the cathode terminal is connected to the first terminal of the switch module to form a second branch;

wherein the trigger hold-on unit is configured to generate the required power to drive the switch module to ensure that the external power source supplies to the LED light bar after the switch module is turned on when the external power source is configured to supply power to the LED light bar.

11. The power system of the universal LED tube in claim 10, wherein the tube holder has an electronic ballast having two input terminals and at least two output terminals;

wherein the first terminal of the first side and the second terminal of the first side are connected to each other and then connected to one of the output terminals of the electronic ballast; and the first terminal of the second side and the second terminal of the second side are connected to each other and then connected to the other output terminal of the electronic ballast when the universal LED tube is installed on the tube holder; the external power source is connected to the two input terminals of the electronic ballast to supply power to the universal LED tube.

12. The power system of the universal LED tube in claim 10, wherein the tube holder has an electronic ballast having two input terminals and at least two output terminals;

wherein the first terminal of the first side and the second terminal of the first side of each universal LED tube are connected to each other and then connected to one of the output terminals of the electronic ballast; and the first terminal of the second side and the second terminal of the second side of each universal LED tube are connected to each other and then correspondingly connected to other output terminals of the electronic ballast when a plurality of universal LED tubes are installed on the tube holder; the external power source is connected to the two input terminals of the electronic ballast to supply power to the universal LED tubes.

13. The power system of the universal LED tube in claim 10, wherein the tube holder has a magnetic ballast having one input terminal and one output terminal;

wherein the first terminal of the first side is connected to the first terminal of the second side via a short-circuit component, and the second terminal of the second side is connected to the output terminal of the magnetic ballast when the universal LED tube is installed on the tube holder; the external power source is connected to the second terminal of the first side and the input terminal of the magnetic ballast to supply power to the universal LED tube.

14. The power system of the universal LED tube in claim 10, wherein the first terminal of the second side and the second terminal of the second side are no connection when the universal LED tube is installed on the tube holder; the external power source is connected to the first terminal of the first side and the second terminal of the first side of the universal LED tube to supply power to the universal LED tube.

15. The power system of the universal LED tube in claim 10, further comprising:

a visual filament circuit having:

a first detection resistor; and a second detection resistor connected to the first detection resistor in series to form a detection branch; wherein the detection branch is connected to the first terminal of the first side and the second terminal of the first side of the universal LED tube.

16. The power system of the universal LED tube in claim 15, wherein the first detection resistor is a positive temperature coefficient (PTC) thermal resistor.

* * * * *